United States Patent

Takada et al.

[11] 4,041,207
[45] Aug. 9, 1977

[54] HEAT RESISTANT RUBBER LAMINATES

[75] Inventors: Tsutomu Takada, Yokohama; Shingo Kato, Tokyo; Tadashi Utsunomiya, Yokohama; Sakae Inoue, Kodaira, all of Japan

[73] Assignee: Bridgestone Tire Company Limited, Tokyo, Japan

[21] Appl. No.: 730,397

[22] Filed: Oct. 7, 1976

[30] Foreign Application Priority Data

Oct. 7, 1975    Japan ................................ 50-120244

[51] Int. Cl.² .......................................... B32B 27/00
[52] U.S. Cl. .................................. 428/421; 428/36; 428/520
[58] Field of Search ................. 428/36, 421, 422, 520

[56] References Cited

U.S. PATENT DOCUMENTS

| | | | |
|---|---|---|---|
| 3,657,046 | 4/1972 | Furukawa et al. | 428/520 |
| 3,904,470 | 9/1975 | Fukuki et al. | 428/520 |
| 3,940,527 | 2/1976 | Brandon | 428/421 |
| 3,990,479 | 11/1976 | Stine et al. | 428/36 |

Primary Examiner—William J. Van Balen
Attorney, Agent, or Firm—Sughrue, Rothwell, Mion, Zinn and Macpeak

[57] ABSTRACT

A heat resistant rubber laminate composed of a base layer consisting mainly of a heat resistant rubber composition and a heat resistant top cover consisting mainly of an ethylene-fluoropropylene copolymeric rubber.

18 Claims, 2 Drawing Figures

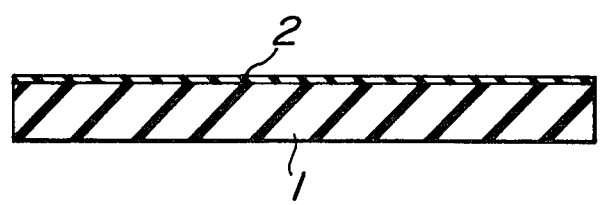
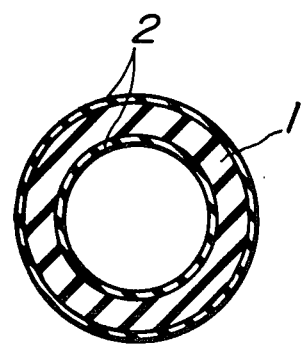

HEAT RESISTANT RUBBER LAMINATES

BACKGROUND OF THE INVENTION

1. Field of the Invention

The present invention relates to a heat resistant rubber laminate composed of a rubber base layer and a fluorine-containing heat resistant top cover.

2. Description of the Prior Art

Heretofore, as the general heat resistant rubbers, chloroprene (CR), butyl rubber (IIR), halogenated butyl rubber, ethylene-propylene-nonconjugated terpolymeric rubber (EPDM) and ethylene-propylene copolymeric rubber (EPR) have been well known and these rubbers have been used for producing industrial rubber products in many cases, because these rubbers are excellent in the processability and have a high adhesion to the other materials and are relatively inexpensive. However, when these rubbers are used as a top cover of the heat resistant conveyor belt, the heat resistance is not necessarily satisfied and these rubbers cannot endure use for a long time under a high temperature condition.

As an embodiment, a heat resistant conveyor belt provided with the top cover consisting mainly of EPDM has been proposed but when this conveyor belt is used at a temperature higher than 150° C, the top cover is aged and hardening and cracks are caused and growth of cut is noticeable, so that this conveyor belt cannot endure use for a long time.

As the specific heat resistant rubbers, there are acrylic rubber, epichlorohydrin rubber (CHR), epichlorohydrinethylene oxide copolymeric rubber (CHC), silicone rubber, fluorine rubber and the like and among these rubbers, silicone rubber and fluorine rubber have a heat resistance up to about 150°-200° C, so that these rubbers have been expected to be used as the material for rubber articles for a super high temperature. However, these specific heat resistant rubbers are not only very expensive, but also there is a problem in the technic for adhering to other materials, so that the use is limited to a very narrow field.

Accordingly, the heat resistant rubber articles are usually produced from the above described general heat resistant rubbers, so that the use scope is limited within a lower temperature range as compared with the above described specific heat resistant rubbers.

SUMMARY OF THE INVENTION

According to the present invention, there is provided a heat resistant rubber laminate composed of a base layer consisting mainly of a heat resistant rubber composition and a heat resistant top cover consisting mainly of ethylene-fluoropropylene copolymeric rubber, which is adhered on the surface of the base layer.

According to another aspect of the present invention, there is provided a heat resistant rubber laminate composed of the above described base layer of the heat resistant rubber consisting mainly of an ethylene-α olefin copolymeric rubber or a blend of an ethylene-α olefin copolymeric rubber with a halogenated butyl rubber and the above described top cover consisting mainly of an ethylene-fluoropropylene copolymeric rubber or a blend of an ethylene-fluoropropylene copolymeric rubber with at least one of an ethylene-α olefin copolymeric rubber and a halogenated butyl rubber.

It is an object of the present invention to provide a heat resistant rubber laminate having much more excellent heat resistance than that of the conventional heat resistant laminate.

The heat resistant rubber laminate according to the present invention does not substantially vary in the physical properties after aging and is excellent in the bending crack resistance. Furthermore, said laminate is protected by the top cover having the specific composition, so that the deterioration of the base layer due to the heat aging is less.

It is another object of the present invention to provide a heat resistant rubber laminate in which the base layer and the top cover are crosslinked to be tightly adhered and which has a good roll processability.

Heretofore, it has been known that the adhesion of the mutual rubbers in such a heat resistant rubber laminate is poor and it has been impossible to obtain the laminate having a satisfactorily high tensile strength and the processing of the laminate is difficult but if the top cover and the specific compositions as described in the present invention and the base layer are used, the heat resistant rubber laminate having a high adhesion and an excellent roll processability can be obtained.

It is a further object of the present invention to provide an inexpensive heat resistant laminate considering its excellent properties.

This is based on the fact that as mentioned above, the heat resistant rubber laminate is better in the heat resistance and the adhesion of the base layer and the top cover and is more excellent in the roll processability than the conventional heat resistant rubber laminate.

According to the present invention, the top cover compositions are excellent in processability and adhesion to the other materials, so that the heat resistant rubber laminates according to the present invention are applicable to industrial rubber products, for example, production of conveyor belt, hose, rubber screen, vibration insulating rubber, vibration insulating mat and the like.

BRIEF DESCRIPTION OF THE DRAWINGS

The drawings show embodiments of application of the heat resistant rubber laminates according to the present invention.

FIGS. 1 and 2 show the cross-sectional views of a heat resistant conveyor belt and a heat resistant hose respectively.

DESCRIPTION OF THE PREFERRED EMBODIMENTS

For the base layer 1 of the heat resistant rubber laminate, general heat resistant rubbers are used and the base layer is generally provided with a core layer (not shown) composed of an optional material. As the heat resistant rubbers, chloroprene rubber (CR), butyl rubber (IIR), halogenated butyl rubber, ethylene-propylene-non-conjugated copolymeric rubber (EPDM), ethylene-propylene copolymeric rubber (EPR) and so on are used alone or in a blend. Particularly, in the present invention, the rubber consisting mainly of EPDM or EPR, more particularly a blend rubber of 60-95 parts by weight of EPR and 5-40 parts by weight of a halogenated butyl rubber (chlorinated butyl rubber, brominated butyl rubber) are preferably used.

On the above described base layer 1 is laminated a top cover 2 which is a characteristic of the present invention. In the present invention, as the rubber of the top cover, use may be made of ethylene-fluoropropylene copolymeric rubbers and among them such copolymeric rubbers containing 10–50 mol% of fluoropropylene are effectively used. In particular, when the abrasion resistance is required in view of the use, ethylene-fluoropropylene copolymeric rubbers having a low content of fluoropropylene provide the good results. As the fluoropropylenes, mention may be made of hexafluoropropylene and trifluoropropylene and among them hexafluoropropylene is most preferable. Furthermore, ethylene-fluoropropylene-ethylenic unsaturated monomer copolymeric rubbers may be used and as the ethylenic unsaturated monomers, mention may be made of olefins, unsaturated carbonic acids, vinyl ethers and the like, for example, propylene, butene, hexene, acrylic acid, maleic acid, fumaric acid, phenyl vinyl ether and so on.

The inventors have found that ethylene-fluoropropylene copolymeric rubber to be used in the present invention is excellent in the heat resistance and is low in the vapor permeability and does not permit diffusion of vapor into the interior and prevents the aging of the inner base layer, so that this rubber is preferable for production of the laminate having a high heat resistance. That is, silicone rubber itself is high in heat resistance but cannot protect the aging of the inner base layer, so that this rubber cannot provide a laminate having the satisfactory heat resistance As the fluorine-containing synthetic rubber, Viton (made by DuPont Co. fluorovinylidene-hexafluoropropene copolymer). Aflas (made by Asahi Glass Co. tetrafluoroethylene-propylene copolymer) and so on have been known, but these fluorine-containing synthetic rubbers are poor in processability and adhesion, so that these rubbers are not applicable for production of a laminate.

In the preferred embodiment of the present invention, the above described ethylene-fluoropropylene copolymeric rubber or a blend of the ethylene-fluoropropylene copolymeric rubber with at least one of a halogenated butyl rubber and an ethylene-α olefin copolymeric rubber is used. As the ethylene-α olefin copolymeric rubbers, ethylene-propylene copolymeric rubber is preferable but ethylene-propylene-nonconjugated diene terpolymer may be used. The nonconjugated dienes include 1,4-hexadiene, 5-methylene-2-norbornene, cyclopentadiene, cyclooctadiene and the like. The halogenated butyl rubbers involve a halogenated product of isobutylene-isoprene copolymeric rubber and chlorinated butyl rubber and brominated butyl rubber are preferable. When a blend of an ethylene-fluoropropylene copolymeric rubber with an ethylene-α olefin copolymeric rubber is used as the rubber constituting the top cover 2, the amount of ethylene-α olefin copolymeric rubber used in 100 parts by weight of rubber is 5–60 parts by weight. When a blend rubber of an ethylene-fluoropropylene copolymeric rubber with a halogenated butyl rubber is used as the top cover, the amount of the halogenated butyl rubber used in 100 parts by weight of rubber is 5–40 parts by weight. Furthermore, when a blend rubber of an ethylene-fluoropropylene copolymeric rubber with an ethylene-α olefin copolymeric rubber and a halogenated butyl rubber is used as the top cover, in 100 parts by weight of the rubber, an amount of the ethylene-α olefin copolymeric rubber is 5–30 parts by weight (preferably 5–25 parts by weight), an amount of the halogenated butyl rubber is 5–30 parts by weight (preferably 5–20 parts by weight) and the remainder (60–90 parts by weight) is the ethylene-fluoropropylene copolymeric rubber.

In the rubber composition of the base layer 1 and top cover 2, a crosslinking agent and a variety of additives other than the above described rubbers may be compounded. As the cross-linking agent, use may be made of organic peroxides, for example, 2,5-dimethyl-2,5-di(-benzoyl peroxy)-hexane, n-butyl-4,4-bis(t-butylperoxy) valerate, di-t-butylperoxy-diisopropylenebenzene, t-butylperoxybenzoate, dicumyl peroxide, benzoyl peroxide and the like. In this case, polyfunctional monomers, for example, ethylenedimethacrylate, polyethyleneglycoldimethacrylate, trimethylolpropanetrimethacrylate, cyclohexylmethacrylate, acrylmethacrylate, divinylbenzene, diallylithaconate, triallylisocyanurate, triallylcyanurate, diallylphthalate, vinyltoluene, vinylpyridine, divinyldichlorosilane, triallylphosphate and so on may be together used as a cross-linking assistant.

An amount of the above described crosslinking agent and crosslinking assistant is not limited but is generally 1–10 parts by weight.

The other compounding agents are inorganic fillers, such as carbon black, metal oxides, silica, calcium carbonate, magnesium carbonate, clay, glass bead, organic fillers, such as lignin, vegetable oils, animal oils, aromatic, paraffinic, and naphthenic mineral oils, synthesis plasticizers, such as phthalic acid ester, phosphoric acid ester and the like, oligomers, such as butene, butadiene, styrene and the like, organic fibers, such as nylon, rayon, polyester and the like, inorganic fibers, such as glass fiber, carbon fiber and the like, age resisters, such as antioxidant, ozone aging resister, ultraviolet ray absorbing agent, coloring agents, such as titanium white, red oxide and these compounding agents are conveniently compounded depending upon the object.

It is natural that the thickness of the top cover 2 is pertinently selected depending upon the use and is 0.5–10 mm, preferably 1–3 mm considering the economic view.

On the surface of a base layer 1 composed of a heat resistant rubber composition is laminated the top cover 2, which is characteristic of the present invention, in an uncrosslinked state and the laminate is shaped into a variety of articles and then the shaped articles are crosslinked to adhere the laminate in the same manner as the process for vulcanizing the rubber articles.

In the heat resistant laminates as explained hereinbefore, both the base layer 1 and the top cover 2 are excellent in the heat resistance, so that the laminates can be used as the products having a satisfactorily high heat resistance and particularly the top cover 2 is composed of a material endurable to a super high temperature, so that the formed laminates can be used as the heat resistant products which are more excellent than the conventional laminates and the adhesion of the top cover 2 to the base layer 1 is excellent and a specific heat resistant rubber having a low vapor permeability is used as the top cover, so that the rubber laminate has the characteristic of the heat resistant rubber products which effectively utilize the property as an elastomer without deteriorating the durability of the whole product. Furthermore, the top cover 2 is characterized by the properties after aging, particularly the excellent bending resistance and crack growth resistance. In addition, ethylene-hexafluoropropylene copolymer to be used in the present invention is excellent in oil resistance other than the heat resistance, so that the rubber laminates develop excellent properties as the industrial rubber products.

The present invention will be explained in more detail.

The following examples are given for the purpose of illustration of this invention and are not intended as limitations thereof.

EXAMPLE 1

Ethylene-propylene copolymeric rubber EP-11 (made by Japan Synthetic Rubber Co. EPR), ethylene-hexafluoropropylene copolymeric rubber, (EF rubber, made by Sumitomo Chemical Co., content of hexafluoropropylene: 34.7 mol%, intrinsic viscosity determined as methyl ethyl ketone solution at 30° C: 0.40) and silicone rubber SH-75 (made by Toray Silicon Co.) were prepared for the rubber of the top cover. An uncrosslinked EPR (EP-11) sheet having a thickness of 8 mm and having the composition as shown in the following Table 1 was used for the base layer and an uncrosslinked rubber sheet having the composition as shown in the following Table 1 and having a thickness of 3 mm was put on the base layer and both the top cover rubber and the base layer were crosslinked to adhere the top cover and the base layer at 170° C for 45 minutes to form laminates. The formed laminates were aged in an oven at 200° C for 72 hours and the physical properties of the top cover and the base layer before and after the heat aging were determined. The obtained results are shown in the following Table 1.

From the above table, it can be seen that when the top cover is EPR and the heat aging is effected at 200° C, the deterioration of the top cover is extremely promoted, while in the case of EF rubber, a blend rubber of EF rubber with EPR or silicone rubber, the deterioration of the top cover does not occur so much and when EF rubber or a blend of EF rubber with EPR is used for the top cover, the base layer is less in the aging than the case where the silicone rubber is used as the top cover.

Thus, when the rubber composition consisting mainly of EF rubber is laminated on the surface of the heat resistant base layer according to the present invention, the rubber laminate having a high heat resistance can be obtained owing to the high heat resistance and the low vapor permeability of the top cover.

EXAMPLE 2

As the base layer, use was made of EPR sheet having a thickness of 12 mm and as the top cover, use was made of EF rubber, a blend rubber of EF rubber with EPR, EPR or silicone rubber to form four kinds of rubber laminates. The physical properties of the base layer relative to the top cover before and after the heat aging were determined as in Example 1. The obtained results are shown in the following Table 2. The compounding was made in the same manner as described in Example 1.

Table 1

| Composition (parts by weight) | Example 1-1 | | Example 1-2 | | Comparative Example 1-1 | | Comparative Example 1-2 | | Base layer | |
|---|---|---|---|---|---|---|---|---|---|---|
| EPR | — | | 50 | | — | | 100 | | 100 | |
| EF rubber | 100 | | 50 | | — | | — | | — | |
| Silicone rubber | — | | — | | 100 | | — | | — | |
| Carbon black | 20 | (a) | 35 | (b) | — | | 35 | (b) | 35 | (b) |
| MgO | 15 | | — | | — | | — | | — | |
| ZnO | — | | 5 | | — | | 5 | | 5 | |
| Stearic acid | — | | 0.5 | | — | | 0.5 | | 0.5 | |
| Antioxidant RD (f) | 0.5 | | 0.5 | | — | | 0.5 | | 0.5 | |
| MB (g) | 2 | | 2 | | — | | 2 | | 2 | |
| Triallylisocyanurate | 2.5 | | 2.5 | | — | | 2.5 | | 2.5 | |
| Organic peroxide | 3.7 | (c) | 4.2 | (d) | 1.2 | (e) | 3.5 | (d) | 3.5 | (d) |
| Physical Property | | | | | | | | | | |
| Top Cover | | | | | | | | | | |
| Before aging | | | | | | | | | | |
| Tensile strength (kg/cm²) | 107 | | 149 | | 95 | | 147 | | | |
| Elongation (%) | 310 | | 280 | | 400 | | 370 | | | |
| 100% modulus (Kg/cm²) | 22 | | 36 | | 29 | | 18 | | | |
| After aging (200° C × 72 hours) | | | | | | | | | | |
| Tensile strength (Kg/cm²) | 109 | (+2) | 75 | (−50) | 65 | (−32) | 16 | (−89) | | |
| Elongation (%) | 260 | (−16) | 180 | (−36) | 290 | (−27) | 150 | (−59) | | |
| 100% modulus (Kg/cm²) | 33 | (+50) | 51 | (+42) | 31 | (+7) | 14 | (−22) | | |
| Base layer | | | | | | | | | | |
| Before aging | | | | | | | | | | |
| Tensile strength (Kg/cm²) | 147 | | 147 | | 147 | | 147 | | | |
| Elongation (%) | 370 | | 370 | | 370 | | 370 | | | |
| 100% modulus (Kg/cm²) | 18 | | 18 | | 18 | | 18 | | | |
| After aging (200° C × 72 hours) | | | | | | | | | | |
| Tensile strength (Kg/cm²) | 132 | (−10) | 128 | (−13) | 103 | (−30) | 123 | (−16) | | |
| Elongation (%) | 396 | (+7) | 389 | (+5) | 359 | (−3) | 360 | (−3) | | |
| 100% modulus (Kg/cm²) | 20 | (+13) | 20 | (+13) | 17 | (−6) | 18 | (0) | | |

Note 1
(a) MT Carbon black
(b) ISAF Carbon black
(c) t-butylperoxybenzoate
(d) Peroximon F-40 (made by Nippon Oil and Fats Co., Ltd., active component 40%, di-t-butyl-peroxy-di-isopropylbenzene)
(e) 2,5-dimethyl-2,5-di(t-butylperoxy)hexane 50%, silicone oil + diatomaceous earth 50%
(f) Polymerized-1,2-dihydro-2,2,4-trimethylquinoline
(g) Mercaptobenzoimidazole
Note 2
Parenthesis shows variation percent Table 2

| | | Top cover (Thickness: 1 mm) | | | |
|---|---|---|---|---|---|
| | Physical properties | Example 2-1 EF rubber | Example 2-2 EF rubber/EPR | Comparative Example 2-1 Silicone rubber | Comparative Example 2-2 EPR |
| Base layer | Before aging | | | | |
| | Tensile strength (Kg/cm$^2$) | 147 | 147 | 147 | 147 |
| | Elongation (%) | 370 | 370 | 370 | 370 |
| | 100% modulus (kg/cm$^2$) | 18 | 18 | 18 | 18 |
| | After aging (200° C × 72 hours) | | | | |
| | Tensile strength (Kg/cm$^2$) | 98 (−33) | 90 (−39) | 82 (−44) | 86 (−41) |
| | Elongation (%) | 296 (−20) | 333 (−10) | 340 (−8) | 270 (−27) |
| | 100% modulus (Kg/cm$^2$) | 21 (+19) | 18 (0) | 16 (−17) | 19 (+6) |

From the above table, it can be seen that even if the thickness of the top cover is smaller than that in Example 1, the aging of the base layer in the heat resistant rubber laminates of the present invention is less.

EXAMPLE 3

As a fluorine-containing ethylene copolymeric rubber, a halogenated butyl rubber and an ethylene-α olefin copolymeric rubber (EPR), use were made of ethylene-hexafluoropropylene copolymeric rubber (made by Sumitomo Chemical Co., a content of hexafluoropropylene: 17.4 mol%, intrinsic viscosity determined as xylene solution at 120° C: 0.63), ESSO Butyl HT1066 (made by ESSO Petroleum Co., chlorinated butyl rubber) and EP-11 (made by Japan Synthetic Rubber Co., ethylene-propylene copolymeric rubber) respectively.

Rubbers and various additives were mixed following to the composition as shown in Table 4 to form rubber compositions. The resulting rubber compositions were crosslinked at 170° C for 45 minutes. These crosslinked rubber compositions were heat aged at 200° C for 72 hours and then the physical properties were measured and compared with those prior to the heat aging. The obtained results are shown in the following Table 4.

Furthermore, the adhering test was carried out as follows. An uncrosslinked rubber composition sheet having a thickness of 2 mm and having the composition as shown in the following Table 4 (one side was reinforced by a canvas) was put on an uncrosslinked rubber composition having a thickness of 2 mm and having the composition as shown in the following Table 3 (one side was reinforced by a canvas) and both the sheets were crosslinked to be adhered and the formed rubber laminate was cut into a strip form having a breadth of 25 mm and both the sheets were peeled off by a tension.

Table 3

| | Parts by weight |
|---|---|
| Ethylene-propylene copolymeric rubber (EPR) EP-11 | 90 |
| Chlorinated butyl rubber (Cl-IIR) HT1066 | 10 |
| Carbon black | 40 |
| Zinc white (ZnO) | 5 |
| Stearic acid | 0.5 |
| Antioxidant RD *1 | 0.5 |
| MB *2 | 2.0 |
| Softening agent (Paraffine oil) | 10 |
| Triallylisocyanurate | 2.5 |
| Cross-linking agent *3 | 3.5 |

*1 Polymerized-1,2-dihydro-2,2,4-trimethylquinoline.
*2 Mercaptobenzoimidazole.
*3 Peroximon F-40 (made by Nippon Oil and Fats Co., Ltd. active component 40%, di-t-butyl-peroxy-di-diisopropylbenzene).

Table 4

| | Example 3-1 | Example 3-2 | Example 3-3 | Example 3-4 |
|---|---|---|---|---|
| EF rubber | 100 | 70 | 90 | 70 |
| Ethylene-propylene copolymeric rubber (EPR) EP-11 | — | 30 | — | 20 |
| Chlorinated butyl rubber (Cl-IIR) HT1066 | — | — | 10 | 10 |
| Carbon black | 25 | 25 | 25 | 25 |
| Zinc white | 5 | 5 | 5 | 5 |
| Stearic acid | 0.5 | 0.5 | 0.5 | 0.5 |
| Antioxidant RD | 0.5 | 0.5 | 0.5 | 0.5 |
| MB | 2.0 | 2.0 | 2.0 | 2.0 |
| Triallylisocyanurate | 2.5 | 2.5 | 2.5 | 2.5 |
| Organic peroxide *1 | 5.0 | 3.0 | 4.0 | 3.0 |
| Before aging | | | | |
| Hardness (JIS°) | 79 | 70 | 78 | 73 |
| Tensile strength (Kg/cm$^2$) | 176 | 142 | 178 | 155 |
| Elongation (%) | 220 | 280 | 250 | 290 |
| 100% modulus (Kg/cm$^2$) | 54.0 | 28.0 | 47.5 | 33.5 |
| 200% modulus (Kg/cm$^2$) | 163 | 81.0 | 137 | 94.5 |
| After aging (200° C × 72 hrs.) | | | | |
| Hardness (JIS°) | 86 (+7) | 79 (+9) | 82 (+4) | 79 (+6) |
| Tensile strength (Kg/cm$^2$) | 183 (+4) | 121 (−15) | 158 (−11) | 125 (−17) |
| Elongation (%) | 210 (−5) | 230 (−18) | 240 (−4) | 260 (−10) |
| 100% modulus (Kg/cm$^2$) | 82.8 (+53) | 46.0 (+64) | 66.5 (+40) | 44.0 (+31) |
| 200% modulus (Kg/cm$^2$) | | 100 (+23) | 126 (−8) | 94.0 (−1) |

Table 4-continued

|  | Example 3-1 | Example 3-2 | Example 3-3 | Example 3-4 |
|---|---|---|---|---|
| Adhesion (Kg/25 mm) | 12 | 18.5 | 40 | 38.5 |

Note:
*1 Peroximon F-40 (made by Nippon Oil and Fats Co., Ltd., active component 40%, di-t-butyl-peroxy-diisopropyl-benzene).
Parenthesis in hardness:
Hardness after aging-hardness before aging.
Parenthesis in the other physical properties:
Variation percent.

From the above described results, it can be seen that the rubber compositions in Example 3-1 and Example 3-2 are noticeable in the increase of the hardness and modulus after the aging and the adhesion is lower, while in the rubber compositions in Example 3-3 and Example 3-4, the variation of the hardness and modulus after the aging is restrained and the adhesion is considerably improved. Namely, the rubber composition compounded with chlorinated butyl rubber is suitable for the top cover of the laminate and is applicable for dynamic use, such as belt.

EXAMPLE 4

As the base layer, use was made of an uncrosslinked rubber composition sheet having the composition as shown in Table 3 and having a thickness of 8 mm and on this base layer was put an uncrosslinked rubber composition sheet having the composition as shown in Table 5 and having a thickness of 3 mm as the top cover and both the sheets were crosslinked to be adhered at 170° C for 45 minutes to form a laminate. This laminate was heat aged in an oven at 200° C for 144 hours and the physical properties of the base layer before the aging were compared with those after the aging. The obtained results are shown in the following Table 5.

invention are used as the top cover (Example 4-1, 4-2), the base layer is considerably restrained in the physical properties due to the heat aging.

EXAMPLE 5

A core layer was formed by superposing three coated canvases, each having a thickness of 1 mm and on the upper surface and the bottom surface of said core layer were laminated with uncrosslinked rubber composition sheets having the composition as shown in the following Table 6 and having a thickness of 1 mm to form a base layer. On the base layer was laminated the same uncrosslinked rubber composition sheet as in Example 3-4 shown in Table 4 having a thickness of 3 mm as a top cover and the base layer and the top cover were crosslinked to adhere the base layer and the cover at 170° C for 45 minutes to form a test belt. In the same manner as described above, the rubber composition in Example 3-2 shown in Table 4 and the rubber composition shown in Table 3 were used as the top cover to form belts respectively.

The above described three belts were worked into endless belts and these belts were tested by a transverse type heat running tester in such a manner that the temperature of the belt surface becomes 230° C and the Table 5

|  |  | Comparative Example 4 | Example 4-1 | Example 4-2 |
|---|---|---|---|---|
| Top cover | EF rubber *1 Ethylene-propylene copolymeric rubber | — | 90 | 70 |
|  | EP-11 Chlorinated butyl rubber HT1066 | — | — | 20 |
|  | Silicone rubber SH-75 *2 | 100 | 10 | 10 |
|  | Carbon black | — | 2.5 | 2.5 |
|  | Zinc white | — | 5 | 5 |
|  | Stearic acid | — | 0.5 | 0.5 |
|  | Antioxidant RD | — | 0.5 | 0.5 |
|  | MB | — | 2.0 | 2.0 |
|  | Triallyl-isocyanurate | — | 2.5 | 2.5 |
|  | Organic peroxide | 1.2*3 | 4.0*4 | 3.0*4 |
| Base layer | Before aging Tensile strength (Kg/cm$^2$) | 112 | 112 | 112 |
|  | Elongation (%) | 600 | 600 | 600 |
|  | 100% modulus (Kg/cm$^2$) | 18.6 | 18.6 | 18.6 |
|  | After aging (200° C × 144 hrs.) Tensile strength (Kg/cm$^2$) | 51.0 (−54) | 97.0 (−13) | 93.0 (−17) |
|  | Elongation (%) | 380 (−37) | 470 (−22) | 460 (−23) |
|  | 100% modulus (Kg/cm$^2$) | 16.1 (−11) | 18.7 (+1) | 18.8 (+2) |

Note:
*1 Ethylene-hexafluoropropylene copolymeric rubber (made by Sumitomo Chemical Co., hexafluoropropylene content 17.4 mol%).
*2 Made by Toray Silicon Co.
*3 2,5-dimethyl-2,5-di-(t-butylperoxy)hexane, active component: 50%.
*4 Peroximon F-40 (made by Nipppon Oil and Fats Co., Ltd., active component 40%, di-t-butyl-peroxy-di-isopropylbenzene.

From the above described results, it can be seen that when the rubber compositions according to the present variation of the top cover was determined. The obtained results are shown in the following Table 6.

Table 6

| | Example 5-1 | Example 5-2 | Comparative Example 5-1 |
|---|---|---|---|
| Composition | Rubber composition of Example 3-4 EF rubber/EPR/Cl-IIR | Rubber composition of Example 3-2 EF rubber/EPR | Rubber composition of Table 3 EPR/Cl-IIR |
| Running time | | | |
| 15 hours | Not vary | Not vary | formation of fine cracks |
| 34 hours | Not vary | Formation of fine cracks | Cracks grow, surface is carbonized |
| 43 hours | Formation of fine cracks | Cracks grow | Cracks grow, surface is carbonized |

From the above results, it can be seen that in the belts (Examples 5-1, 5-2) covered by the rubber compositions of the present invention are longer in the time until cracks are formed than the Comparative Example 5-1 and these belts have a high heat resistance.

What is claimed is:

1. A heat resistant rubber laminate composed of a base layer consisting mainly of a heat resistant rubber composition and a heat resistant top cover, wherein said heat resistant top cover being a rubber composition consisting mainly of ethylene-fluoropropylene copolymeric rubber.

2. The heat resistant rubber laminate as claimed in claim 1, wherein the rubber of the top cover is an ethylene-fluoropropylene copolymeric rubber or a blend of an ethylene-fluoropropylene copolymeric rubber with at least one of an ethylene-olefin copolymeric rubber or a halogenated butyl rubber.

3. The heat resistant rubber laminate as claimed in claim 2, wherein the rubber of the top cover is a blend of an ethylene-fluoropropylene copolymeric rubber with an ethylene-$\alpha$ olefin copolymeric rubber.

4. The heat resistant rubber laminate as claimed in claim 2, wherein the rubber of the top cover is a blend of an ethylene-fluoropropylene copolymeric rubber with a halogenated butyl rubber.

5. The heat resistant rubber laminate as claimed in claim 2, wherein the rubber of the top cover is a blend of an ethylene-fluoropropylene copolymeric rubber with ethylene-$\alpha$ olefin copolymeric rubber and a halogenated butyl rubber.

6. The heat resistant rubber laminate as claimed in claim 1, wherein the ethylene-fluoropropylene copolymeric rubber is ethylene-hexafluoropropylene copolymeric rubber or ethylene-trifluoropropylene copolymeric rubber.

7. The heat resistant rubber laminate as claimed in claim 6, wherein the ethylene-fluoropropylene copolymeric rubber is ethylene-hexafluoropropylene copolymeric rubber.

8. The heat resistant rubber laminate as claimed in claim 1, wherein a content of fluoropropylene in the ethylene-fluoropropylene copolymeric rubber is 10-50 mol%.

9. The heat resistant rubber laminate as claimed in claim 2, wherein the ethylene-$\alpha$ olefin copolymeric rubber is ethylene-propylene copolymeric rubber or ethylene-propylene-nonconjugated diene copolymeric rubber.

10. The heat resistant rubber laminate as claimed in claim 9, wherein the ethylene-$\alpha$ olefin copolymeric rubber is ethylene-propylene copolymeric rubber.

11. The heat resistant rubber laminate as claimed in claim 2, wherein the halogenated butyl rubber is chlorinated butyl rubber or brominated butyl rubber.

12. The heat resistant rubber laminate as claimed in claim 11, wherein the halogenated butyl rubber is chlorinated butyl rubber.

13. The heat resistant rubber laminate as claimed in claim 3, wherein the weight amount of the ethylene-fluoropropylene copolymeric rubber to the ethylene-$\alpha$ olefin copolymeric rubber is 95/5–40/60.

14. The heat resistant rubber laminate as claimed in claim 4, wherein the weight amount of the ethylene-fluoropropylene copolymeric rubber to the halogenated butyl rubber is 95/5–60/40.

15. The heat resistant rubber laminate as claimed in claim 5, wherein the weight amount of the ethylene-fluoropropylene copolymeric rubber and ethylene-$\alpha$ olefin copolymeric rubber and the halogenated butyl rubber is 40–90/5–30/5–30, when the total amount of these rubbers is 100 parts by weight.

16. The heat resistant rubber laminate as claimed in claim 1, wherein the top cover composition contains an organic peroxide as a crosslinking agent.

17. The heat resistant rubber laminate as claimed in claim 1, wherein the base layer is a rubber composition in which an ethylene-$\alpha$ olefin copolymeric rubber or a blend of an ethylene-$\alpha$ olefin copolymeric rubber and a halogenated butyl rubber are compounded and a core layer is included within said base layer.

18. The heat resistant rubber laminate as claimed in claim 1, wherein said laminate is a heat resistant conveyor belt.

* * * * *